(12) United States Patent
Greiner et al.

(10) Patent No.: US 8,112,843 B2
(45) Date of Patent: Feb. 14, 2012

(54) CENTERING BUSH AND COMBINATION, SYSTEM AND PRINTING PRESS HAVING THE CENTERING BUSH

(75) Inventors: Adolf Phillip Greiner, Sinsheim (DE); André Kreller, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 527 days.

(21) Appl. No.: 12/127,190

(22) Filed: May 27, 2008

(65) Prior Publication Data
US 2008/0293501 A1 Nov. 27, 2008

(30) Foreign Application Priority Data

May 25, 2007 (DE) .................. 10 2007 024 485

(51) Int. Cl.
*F16L 5/00* (2006.01)
(52) U.S. Cl. .................. 16/2.1; 16/2.3; 16/2.4; 16/2.5; 101/409
(58) Field of Classification Search .............. 16/2.1–2.5; 411/107, 918; 101/246, 408, 411, 409, 410
See application file for complete search history.

(56) References Cited

U.S. PATENT DOCUMENTS

| 2,420,826 A * | 5/1947 | Irrgang ..................... 174/153 G |
| 2,972,367 A * | 2/1961 | Wootton ....................... 411/350 |
| 3,139,768 A * | 7/1964 | Biesecker ..................... 74/502.4 |
| 3,562,847 A * | 2/1971 | Jemison .......................... 16/2.1 |
| 3,643,203 A * | 2/1972 | McLaughlin et al. ........ 439/208 |
| 4,098,185 A * | 7/1978 | Davidson, Jr. ................ 101/137 |
| 4,640,479 A * | 2/1987 | Shely et al. ..................... 248/56 |
| 4,664,032 A * | 5/1987 | Abendroth et al. ........... 101/230 |
| 4,907,626 A * | 3/1990 | Mori ............................. 138/156 |
| 5,440,984 A * | 8/1995 | Becker ........................ 101/415.1 |
| 5,549,523 A * | 8/1996 | Doucet ......................... 475/298 |
| 5,622,248 A * | 4/1997 | Villaverde et al. ........... 198/493 |
| 6,507,976 B2 * | 1/2003 | Ichimaru .......................... 16/82 |
| 6,765,148 B2 * | 7/2004 | Rix ............................... 174/650 |
| 2003/0061679 A1 * | 4/2003 | Chang et al. .................... 16/2.1 |

FOREIGN PATENT DOCUMENTS

| DE | 43 35 471 A1 | 4/1995 |
| DE | 102 17 817 A1 | 11/2002 |

OTHER PUBLICATIONS

German Patent and Trademark Office Search Report, dated Aug. 13, 2007.

\* cited by examiner

*Primary Examiner* — Victor Batson
*Assistant Examiner* — Roberta Delisle
(74) *Attorney, Agent, or Firm* — Laurence A. Greenberg; Werner H. Stemer; Ralph E. Locher

(57) ABSTRACT

A centering bush for connecting components includes a bush head having a construction generally in accordance with that of a blade pin. A combination, a system and a printing press having the centering bush, are also provided.

5 Claims, 6 Drawing Sheets

US 8,112,843 B2

CENTERING BUSH AND COMBINATION, SYSTEM AND PRINTING PRESS HAVING THE CENTERING BUSH

CROSS-REFERENCE TO RELATED APPLICATION

This application claims the priority, under 35 U.S.C. §119, of German Patent Application DE 10 2007 024 485.3, filed May 25, 2007; the prior application is herewith incorporated by reference in its entirety.

BACKGROUND OF THE INVENTION

Field of the Invention

The present invention relates to a centering bush for connecting components, including a bush head.

Such centering bushes serve for positioning the components accurately relative to one another so as to be able to connect them, for example, by screws.

German Published, Non-Prosecuted Patent Application DE 43 35 471 A1 illustrates a centering bush which is resiliently formed so as to center itself in a bore having a very large tolerance zone.

German Published, Non-Prosecuted Patent Application DE 102 17 817 A1 discloses a so-called blade pin having a pin head with two diametric cutting edges. It is only with those two diametric cutting edges that the pin head engages the inner surface of a bore formed in a support, thereby allowing for a slight compensatory movement of the pin head in the bore during assembly. Tolerances of a distance between the bore and another bore are balanced due to that compensatory movement.

During the manufacture of printing presses, the precise positioning of components relative to one another, for example when mounting gripper systems, plays an important role. Such gripper systems include a row of clamping fingers for clamping the printing sheet during transport, and may be part of a drum, a cylinder, or a gripper bar in a sheet delivery. The clamping fingers are disposed on a gripper shaft which, during rotation thereof, moves the clamping fingers to open and close the grippers. The gripper shaft is supported for rotation in a number of pedestal bearings mounted to a common support. The mounting of the pedestal bearings on the support requires a high degree of mounting accuracy.

In the past, attempts have been made to meet those strict accuracy requirements by employing cylinder pins for fixing the pedestal bearings relative to the support. The bore in the pedestal bearing and the bore in the support required for the respective cylinder pin were manufactured in one manufacturing step. For that purpose, the entire assembly including the support and the pedestal bearings have to be clamped in a drill machine or processing center. While clamped, the pedestal bearings have to be aligned with the support with a high degree of accuracy. In order to prevent the shavings, which are formed when the pin bores are drilled, from penetrating into sensitive areas of the assembly which is basically in the assembled state, those areas have to be covered. That manufacturing and assembly process thus is very complex for the reasons given above.

BRIEF SUMMARY OF THE INVENTION

It is accordingly an object of the invention to provide a centering bush and a combination, a system and a printing press having the centering bush, which overcome the hereinafore-mentioned disadvantages of the heretofore-known devices of this general type and which meet the requirements for a less complicated manufacturing and assembly of pedestal bearings for gripper shafts for the manufacturing of printing presses.

With the foregoing and other objects in view, there is provided in accordance with the invention, a centering bush or bushing for connecting components. The centering bush comprises a bush head having a construction generally in accordance with a blade pin or being constructed according to the blade pin principle.

In accordance with another feature of the invention, the bush head is formed narrower in a first radial direction than it is in a second radial direction extending perpendicularly to the first radial direction.

In accordance with a further feature of the invention, the bush head is formed with only two diametrically disposed contact protrusions for effecting contact.

In accordance with an added feature of the invention, the centering bush is constructed substantially as a radially resilient expanding spring.

In accordance with an additional feature of the invention, the centering bush is formed with a longitudinal slot.

With the objects of the invention in view, there is also provided a combination, comprising a centering bush for connecting components, the centering bush having a bush head with a construction generally in accordance with that of a blade pin, and a screw extending through the centering bush.

With the objects of the invention in view, there is additionally provided a system, comprising a combination including a centering bush for connecting components, the centering bush having a bush head with a construction generally in accordance with that of a blade pin, and a screw extending through the centering bush, a first component, and a second component connected to the first component by the combination.

In accordance with yet an added feature of the invention, the first component of the system is a printing press component, and the second component of the system is a pedestal bearing for a gripper shaft.

In accordance with yet an additional feature of the invention, the system further includes a third component, the three components being mechanically joined to one another by the screw.

In accordance with another feature of the invention, the first component and the second component of the system are connected by a further screw and a further centering bush through which the further screw extends.

With the objects of the invention in view, there is concomitantly provided a printing press, comprising the system of the invention.

The centering bush of the invention, which is provided for positioning two components relative to one another when the two components are being connected to each other, includes a bush end which is profiled in such a way that the bush basically acts like a blade pin.

Due to the use of such a centering bush for fixing a pedestal bearing for a gripper shaft on a support, the bore for the centering bush in the pedestal bearing and the bore for the centering bush in the support can be drilled separately. This aspect simplifies the manufacturing of the gripper system considerably. Moreover, redundant dimensioning and so-called tolerance distortions of the bores are avoided, which is an aspect that simplifies the mounting of the gripper system.

In accordance with a refinement or further feature of the centering bush of the invention, the bush end which is radially flattened in accordance with the blade pin principle, i.e. the bush head, has a profile with a first outer dimension and a second outer dimension greater than the first outer dimension. The two outer dimensions are to be measured in directions perpendicular to a longitudinal or central axis of the centering bush and perpendicular to one another.

In accordance with a further refinement or feature, the bush head has two protrusions offset relative to one another by an angle of 180°. In terms of their function, these two protrusions correspond to the two cutting edges of a blade pin. The bush head rests against the inner bore surface of one of the two components, for example a pedestal bearing for a gripper shaft, only with the two protrusions, and with no other region.

In accordance with a further refinement or feature, the centering bush is formed as a spring which exerts a spring force directed substantially radially outwardly relative to the longitudinal or central axis. Thus, the centering bush firmly rests against both the inner surface of the bore of one component and the inner surface of the bore of the other component.

In accordance with a further refinement or feature, the centering bush is formed with a slot extending substantially parallel to the aforementioned longitudinal or central axis. The slot separates the two spring ends of the spring formed by the centering bush and may be straight or have an undulating or meandering shape.

The invention also encompasses a combination which includes the centering bush of the invention or a centering bush in accordance with one of the refinements or features described and shown herein of the centering bush of the invention and, furthermore, a screw for connecting the two components, the screw passing through the centering bush.

In addition, the invention encompasses a system including a first component, a second component, and the aforementioned combination, the first component and the second component being connected to one another by this combination. Thus, in this system, the first component and the second component are connected to one another by a centering bush and a screw. The bush head of this centering bush is profiled in such a way that it acts substantially like a blade pin. The screw passes through the centering bush.

In this context, the first component may be a printing press component and the second component may be a pedestal bearing for a gripper shaft. The pedestal bearing for the gripper shaft is positioned relative to the printing press component by the centering bush and is screwed to the printing press component by the screw.

In accordance with a refinement or further feature of the system, the latter includes a third component. The three components form a stack that is held together by the screw. For example, the pedestal bearing for the gripper shaft may be composed of two bearing block halves shaped substantially like half shells, one forming the second component and the other forming the third component.

In accordance with a further refinement or feature, the system includes a further centering bush for positioning the second component relative to the first component and a further screw for connecting the two components, the further screw passing through the further centering bush. In this case, the further centering bush does not have to be constructed in accordance with the invention. Instead, the preferred shape for the further centering bush is the shape of an ideal cylinder.

Finally, the invention encompasses a printing press, which includes the system in accordance with the invention or a system in accordance with one of the refinements or features described and shown herein.

Those refinements or features which are considered as characteristic for the invention are set forth in the appended claims. Further refinements or features of the invention, which are advantageous in terms of the construction and functioning, will become apparent from the following description of preferred embodiments and the associated drawings.

Although the invention is illustrated and described herein as embodied in a centering bush and a combination, a system and a printing press having the centering bush, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
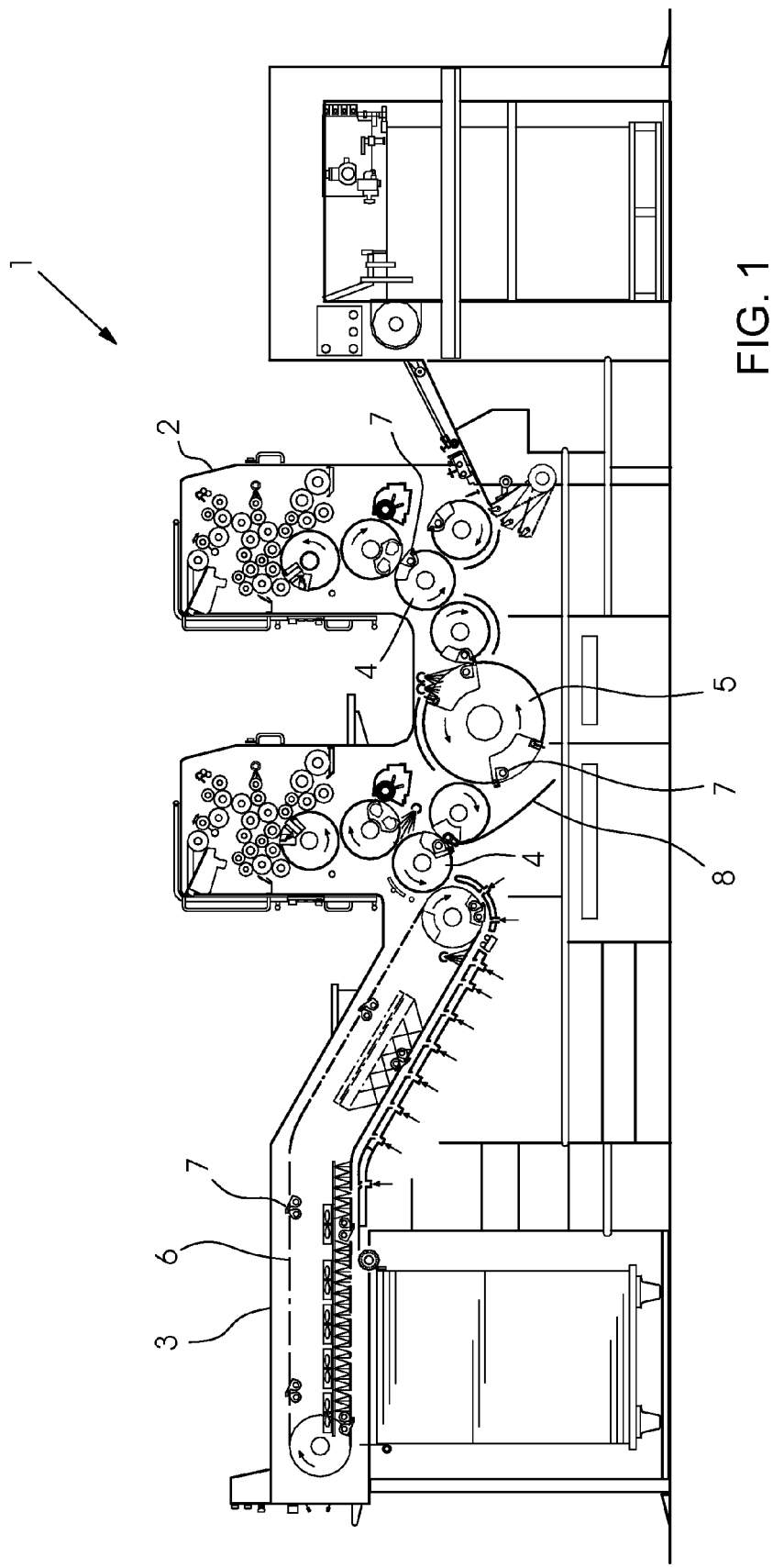
FIG. 1 is a diagrammatic, longitudinal-sectional view of a printing press.

Referring now to the figures of the drawings in detail and first, particularly, to FIG. 1 thereof, there is seen a printing press 1 having printing units 2 and a sheet delivery 3. Each of the printing units 2 includes an impression cylinder 4. A sheet transport drum 5 is provided between the impression cylinders 4. The sheet delivery 3 includes a chain conveyor 6. Each of the impression cylinders 4, the sheet transport drum 5 and the chain conveyor 6 has a gripper system 7 for holding printing sheets 8 during transport thereof.

Figure 2:
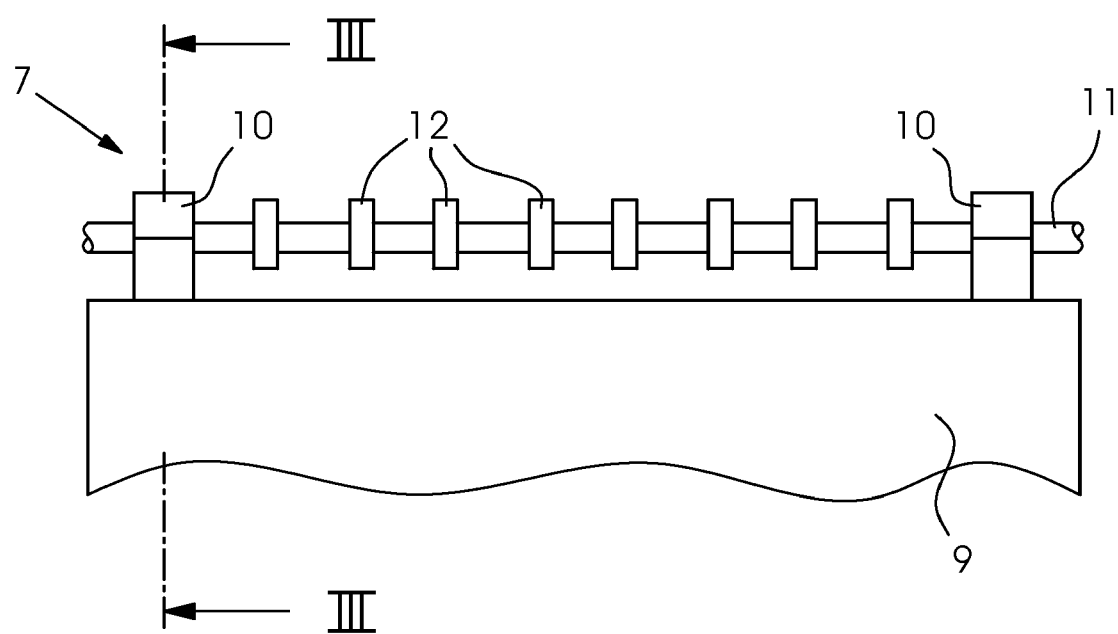
FIG. 2 is a greatly-enlarged, fragmentary, side-elevational view illustrating a gripper system of the printing press.

FIG. 2 is a side view, relative to FIG. 1, showing a gripper system 7, which may be part of any one of the impression cylinders 4, the sheet transport drums 5, or the chain conveyor 6. The gripper system 7 includes a support 9, which may be a cylinder or drum base body, a crossbar, or any other printing press component 9. Bearing blocks or pedestal bearings 10 for a gripper shaft are attached to the support 9. A gripper shaft 11 is supported for rotation in the pedestal bearings 10. Gripper fingers 12, which are pivoted by a rotation of the gripper shaft 11 to clamp and release the printing sheet 8, are disposed on the gripper shaft 11. The number of pedestal bearings 10 which are aligned in a row may be more than two.

Figure 3:
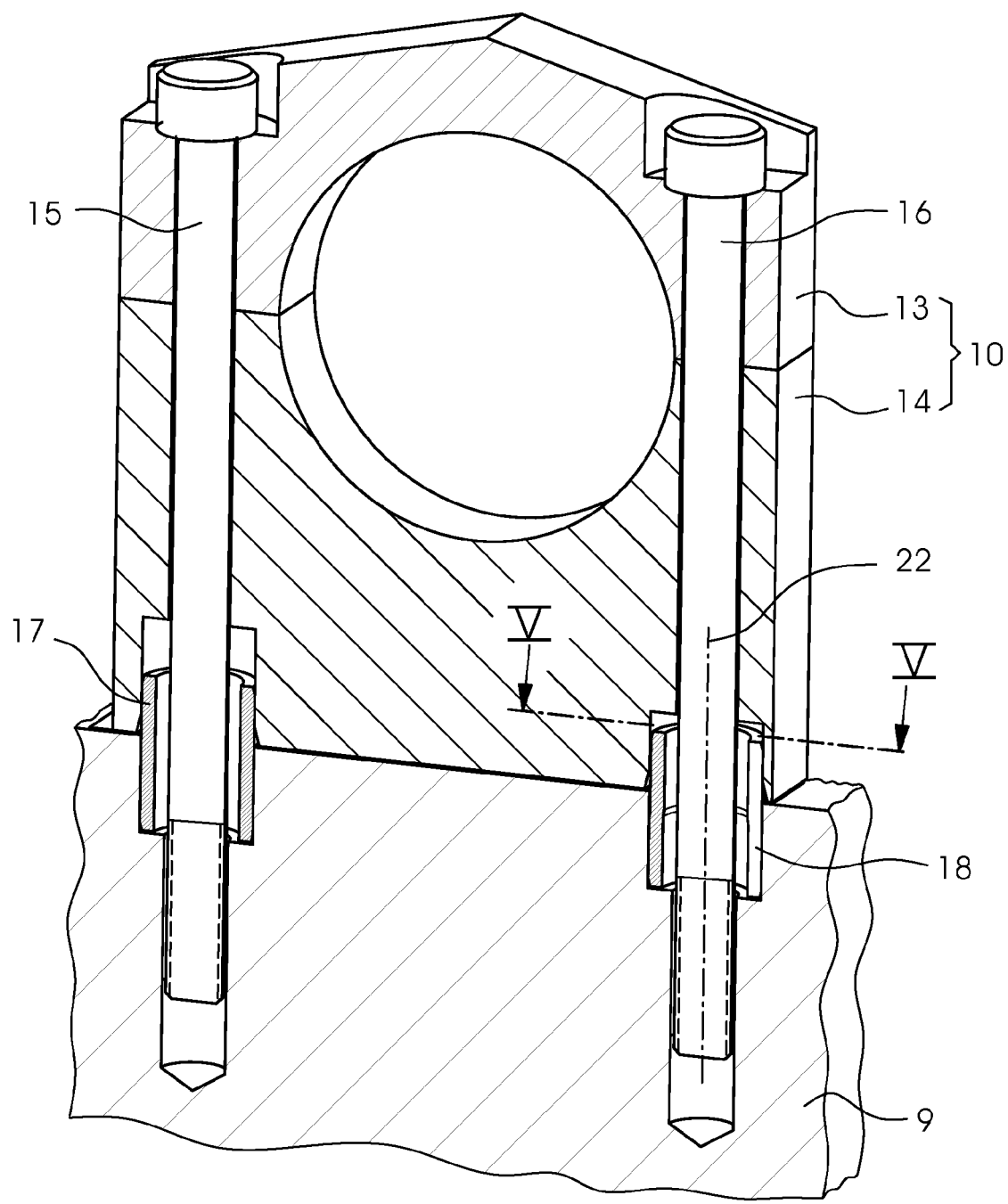
FIG. 3 is an even more greatly-enlarged cross-sectional, perspective view taken along a line III-III of FIG. 2, in the direction of the arrows, showing a support and a pedestal bearing mounted thereon for a gripper shaft of the gripper system.

FIG. 3 is a sectional view taken along the line III-III in FIG. 2 of the attachment of one of the pedestal bearings 10 on the support 9. The gripper shaft 11 is not shown. The pedestal bearing 10 for the gripper shaft is made up of a first bearing half 13 and a second bearing half 14. A first screw 15 and a second screw 16 loosely extend through respective through-bores formed in the two bearing halves 13 and 14 and are screwed into threaded bores formed in the support 9. Screw heads of the screws 15 and 16 are pressed onto the first bearing half 13, which is thus pressed onto the second bearing half 14 which, in turn, is pressed onto the support 9. The through-bores formed in the second bearing half 14 and the threaded bores formed in the support 9 are formed as step bores. The step bores have bore sections of a greater inner diameter at respective ends thereof facing one another. A first centering bush or bushing 17 and a second centering bush or bushing 18 are inserted into these bore sections. The screws 15 and 16 extend through the respective centering bushes 17 and 18 loosely or with play.

Figure 4:
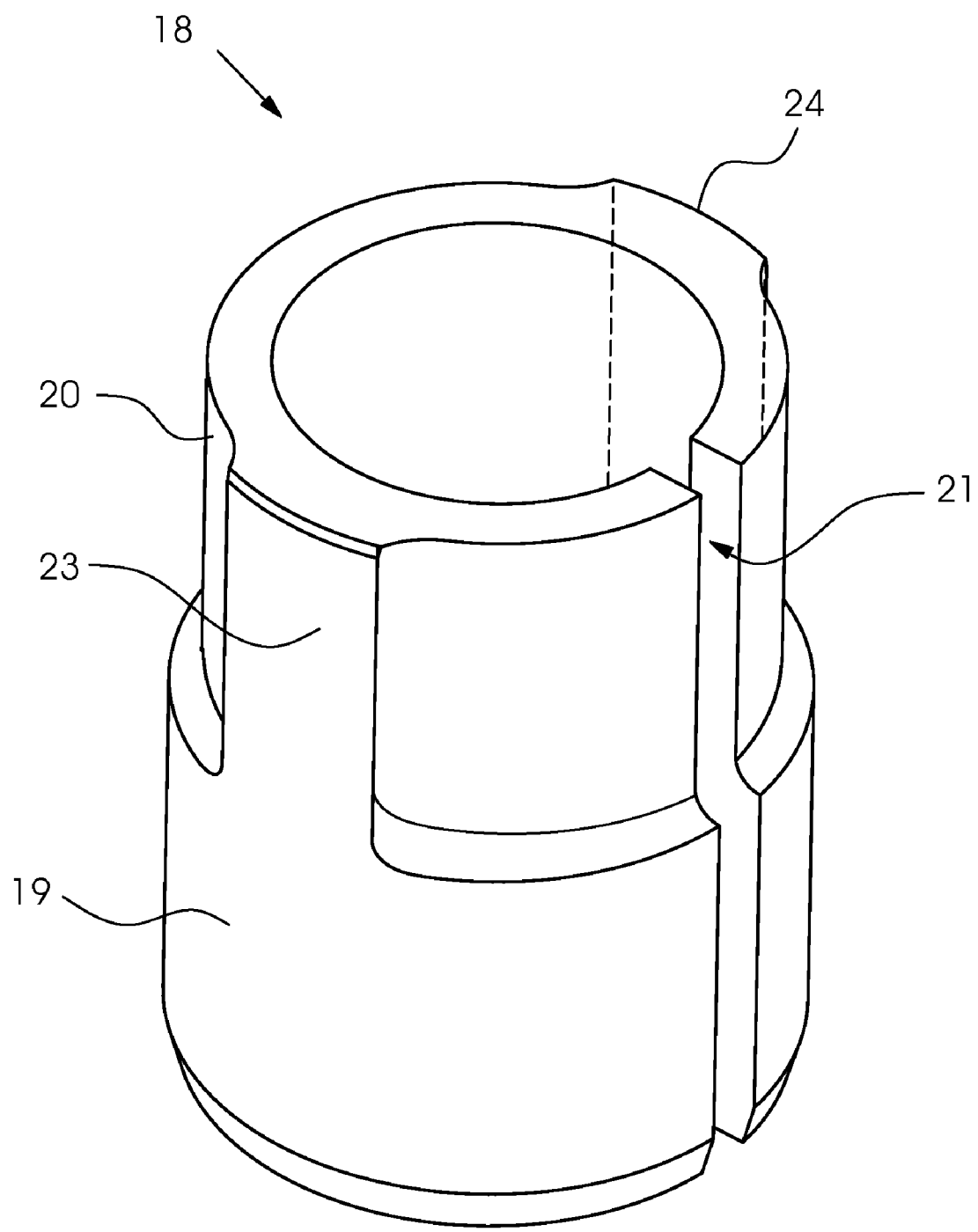
FIG. 4 is a very greatly-enlarged side and top perspective view of a centering bush for positioning the pedestal bearing for the gripper shaft on the support.

FIG. 4 illustrates an enlarged view of the second centering bush 18, which is associated with the second screw 16. The second centering bush 18 has a bush base 19 as a lower bush end to be located in the support 9. The second centering bush 18 has a bush head 20 as an upper bush end to be located in the second bearing half 14. A narrow longitudinal slot 21 extends parallel to a central axis 22 (see FIG. 3) of the second centering bush 18, through the bush base 19 and the bush head 20. Due to the longitudinal slot 21, the second centering bush 18 has a profile which is basically or substantially shaped like a section of a ring. With the exception of the longitudinal slot 21, the circumferential surface of the bush base 19 is free of elevations and depressions. In contrast, the circumferential surface of the bush head 20 has a first contact protrusion 23 and a second contact protrusion 24, which project in the radial direction and are disposed opposite each other. The longitudinal slot 21 is substantially disposed at the center between the two contact protrusions 23 and 24. Thus, each of the contact protrusions 23 and 24 is offset relative to the longitudinal slot 21 by an angle of 90°.

The contact protrusions 23 and 24 are shaped like ribs or webs, which are formed by recessing the circumferential sections of the bush head 20 located between the contact protrusions 23 and 24 in a non-cutting forming process. A convex outer surface of the respective contact protrusion 23, 24 forms a continuation of the circumferential surface of the bush base 19.

Figure 5:
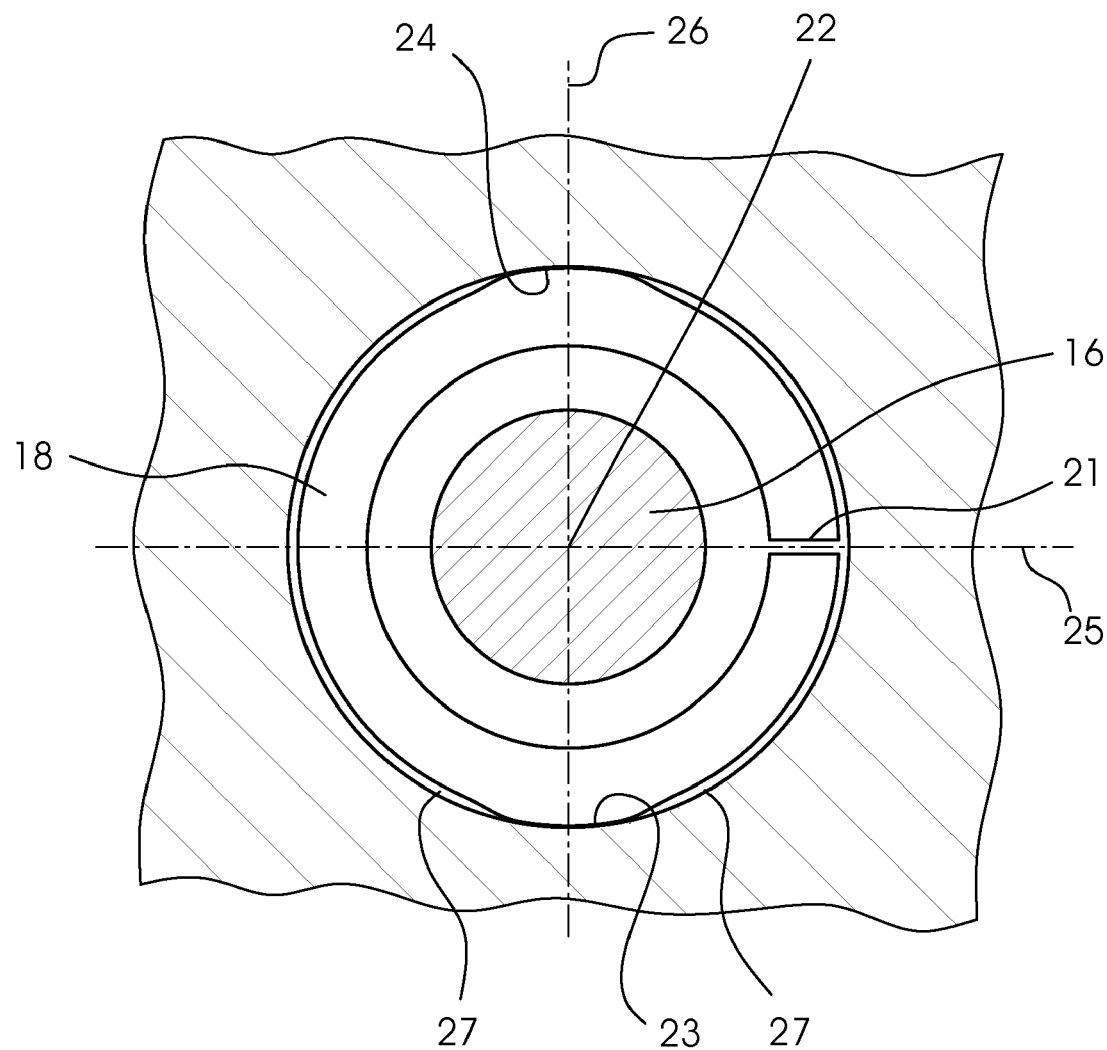
FIG. 5 is a fragmentary, partly-sectional and partly top-plan view taken along a line V-V of FIG. 3 in the direction of the arrows, showing the centering bush in a mounting position.

FIG. 5 is a partly cross-sectional and partly top-plan view taken along the line V-V of FIG. 3 in the direction of the arrows. A common central connecting line 25 between the central axis 22 of the second screw 16 and of the second centering bush 18, and a central axis of the same kind of the first screw 15 and the first centering bush 17 (see FIG. 3), defines a first radial direction. A common diametric line 26 of the contact protrusions 23 and 24 defines a second radial direction and has an orientation which is perpendicular to the central connecting line 25. The longitudinal slot 21 is located on the central connecting line 25. The contacting protrusions 23 and 24 are located on the diametric line 26. FIG. 5 clearly indicates that the entire circumferential region located outside the contact protrusions 23 and 24 is kept at a distance from the inner surface of the bore introduced in the pedestal bearing 10 for the gripper shaft. A clearance or amount of play 27 is present between the circumferential section and the inner surface.

The other, first centering bush 17 (see FIG. 3) does not have any such contact protrusions. With the exception of the region of the longitudinal slot thereof, the first centering bush rests against the inner surface of the bore which is formed for the first centering bush 17 in the pedestal bearing 10.

In a comparable way, the bush bases of the first centering bush 17 and of the second centering bush 18 rest against the inner surface of the respective bore formed in the support 9 along the entire circumferential line.

Due to the flattened cross-sectional shape of the bush head 20 of the second centering bush 18, a slight compensatory movement of the second centering bush 18 within the bore hole in the pedestal bearing 10 is possible during assembly, making use of bore distance tolerances, which the distance between this bore and the bore formed in the pedestal bearing 10 for the first centering bush 17 may have for manufacturing reasons. The compensatory movement is made along the central connecting line 25.

Figure 6:
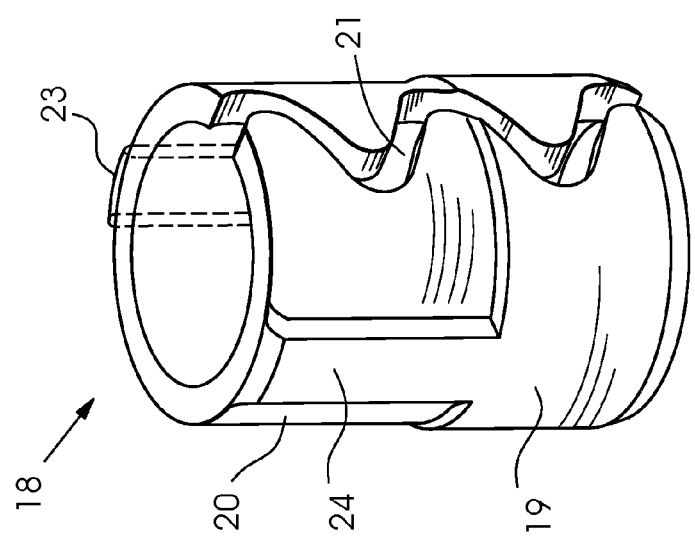

FIG. 6 illustrates an exemplary embodiment of the second centering bush 18, which differs from the one shown in FIG. 4 in terms of the manufacturing of the contact protrusions 23 and 24 and in terms of the shape of the longitudinal slot 21. The contact protrusions 23 and 24 are formed by radially recessing the circumferential sections of the bush head 20 between the contact protrusions 23 and 24 in a cutting or machining process. In this case too, the longitudinal slot 21 has an undulating or meandering shape.

Figure 7:
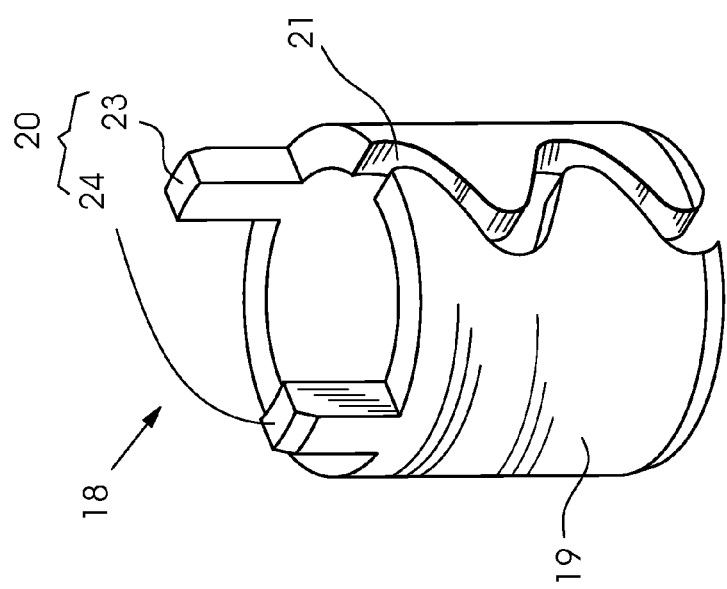

FIG. 7 shows an exemplary embodiment which differs from the one shown in FIG. 6, only by the fact that the circumferential sections of the bush head 20 located between the contact protrusions 23 and 24 are not only recessed, but completely eliminated or ablated. As a result, the contact protrusions 23 and 24 project from an upper edge of the bush base 19 like two small fingers.

Figure 8:
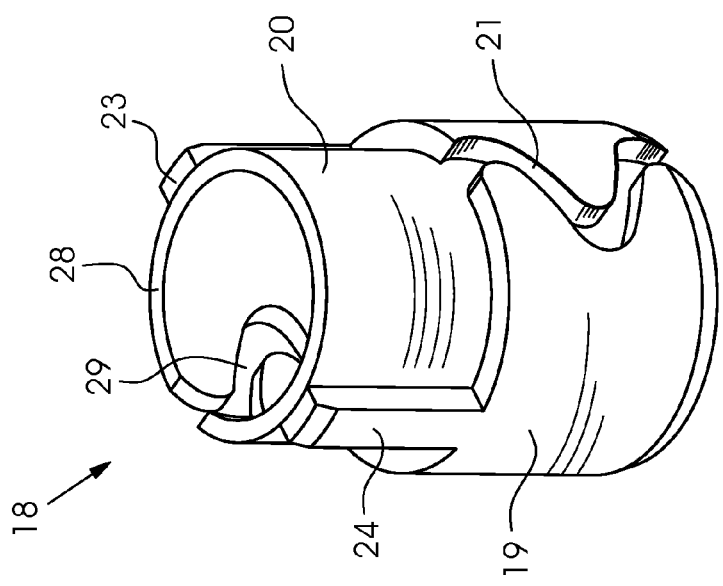
FIGS. 6 to 8 are side and top perspective views, reduced in size, of differently modified embodiments of the centering bush shown in FIG. 4.

FIG. 8 illustrates another exemplary embodiment wherein the second centering bush 18 shown in FIG. 7 is supplemented by an inner sleeve 28. The inner sleeve 28 extends in the longitudinal direction, substantially from the lower edge of the bush base 19 to the upper edge of the contact protrusions 23 and 24 and supports the latter. The inner sleeve 28 is formed as a radially elastic expanding spring and is additionally provided with an undulating or meandering longitudinal slot 29, which is disposed diametrically opposite to the longitudinal slot 21. The slightly pretensioned inner sleeve or bush 28 is inserted into the outer part of the second centering bush 18; the outer part including the bush base 19 and the bush head 20. Thus, the inner sleeve 28 is resiliently pressed against the inner surface of the aforementioned outer part. The second screw 16 (see FIG. 3) loosely passes through the inner sleeve 28 when the pedestal bearing is assembled.

Spring steel is an example of a suitable material for the centering bushes 17 and 18 in all of the exemplary embodiments described herein.

The invention claimed is:
1. A printing press, comprising a system including:
a first component being a printing press component;
a second component being a pedestal bearing for a gripper shaft;
a third component; and
a combination for connecting said components, said combination including a centering bush having a bush head with a construction generally in accordance with that of a blade pin and a screw extending through said centering bush and mechanically joining said first, second and third components to one another.

2. The printing press according to claim 1, wherein said bush head is narrower in a first radial direction than it is in a second radial direction extending perpendicularly to said first radial direction.

3. The printing press according to claim 1, wherein said bush head has only two diametrically opposed contact protrusions for effecting contact.

4. The printing press according to claim 1, wherein said centering bush is constructed substantially as a radially resilient expanding spring.

5. The printing press according to claim 1, which further comprises a longitudinal slot formed in said centering bush.

* * * * *